US 6,725,348 B1

(12) United States Patent
Marier et al.

(10) Patent No.: US 6,725,348 B1
(45) Date of Patent: Apr. 20, 2004

(54) DATA STORAGE DEVICE AND METHOD FOR REDUCING WRITE MISSES BY COMPLETING TRANSFER TO A DUAL-PORT CACHE BEFORE INITIATING A DISK WRITE OF THE DATA FROM THE CACHE

(75) Inventors: Louise Ann Marier, Byron, MN (US); Brian Lee Morger, Chatfield, MN (US); Christopher David Wiederholt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/418,047

(22) Filed: Oct. 13, 1999

(51) Int. Cl.[7] .............................. G06F 9/38; G06F 13/28
(52) U.S. Cl. ...................... 711/169; 711/113; 711/118; 711/149; 711/150; 710/39; 710/55
(58) Field of Search .................... 709/102, 106; 710/39, 52, 55, 260; 711/111, 113, 118, 149, 150, 167, 169; 712/206, 215, 225, 245

(56) References Cited

U.S. PATENT DOCUMENTS

| 4,394,732 A | 7/1983 | Swenson ..................... 711/113 |
| 4,800,483 A | 1/1989 | Yamamoto et al. ......... 710/126 |
| 4,870,565 A | 9/1989 | Yamamoto et al. ......... 711/113 |
| 5,125,084 A | * 6/1992 | Begun et al. ................. 712/33 |
| 5,179,684 A | 1/1993 | Tohchi et al. |
| 5,345,561 A | 9/1994 | Kato |
| 5,701,516 A | 12/1997 | Cheng et al. |
| 6,055,583 A | * 4/2000 | Robbins ...................... 710/22 |

FOREIGN PATENT DOCUMENTS

EP 0510245 A1 10/1992

OTHER PUBLICATIONS

Hennessy, et al. Computer Organiation and Design: The Hardware/Software Interface, $2^{nd}$ ed. 1997. Morgan Kaufmann Publishers, Inc., pp. 436–449.*

* cited by examiner

Primary Examiner—B. James Peikari
(74) Attorney, Agent, or Firm—Bracewell & Patterson, LLP; Roy W. Truelson

(57) ABSTRACT

A data storage device and method for improving the performance of data storage devices examines a command queue and performs data transfers to memory within the device before prior commands have completed. A process running in the idle loop of the controller in the storage device checks the queue for write requests and if a cache space within a dual-port cache to hold the transfer data is available, the data transfer portion of the transfer is completed, while the device is still waiting for completion of prior commands in the queue, and data transfers are completing from the cache to the physical media for the prior command.

16 Claims, 3 Drawing Sheets

DATA STORAGE DEVICE AND METHOD FOR REDUCING WRITE MISSES BY COMPLETING TRANSFER TO A DUAL-PORT CACHE BEFORE INITIATING A DISK WRITE OF THE DATA FROM THE CACHE

BACKGROUND OF THE INVENTION

1. Technical Field

The present invention relates in general to improved storage devices and in particular to an improved method and system for writing data to a storage device. Still more particularly, the present invention relates to an improved method and system for completing the data transfer portion of write commands queued for the storage device.

2. Description of the Related Art

As the performance of microprocessor and semiconductor memory technology increases, there is a need for improved data storage devices with comparable performance enhancements. The typical data storage device comprises an interface to a host computer system, through which it receives commands and through which data is transferred between the host computer system and the storage device. It further comprises physical storage media, such as magnetic or optical platters (disks), on which data is stored. In enhancing the performance of data storage devices, there is a need for improved interaction with system processors and memory devices. The performance of data storage devices is critical in present computer systems, as programs and data are stored on these devices, and must be loaded before the computer performs any operations. In addition, data storage devices are often used as the lowest level of storage in a memory hierarchy consisting of cache memories, main Random Access Memory (RAM) and finally data storage devices (drives). "Page swaps" are made to the storage devices, allowing more efficient use of RAM by writing pages of RAM that have not been recently used to the storage device, freeing the physical memory page for use by the system until it is needed again. When the page is needed again, the system will retrieve it from the storage device, placing it back in physical RAM. While this improves overall system performance, it places a heavy load on data storage devices that are used for swap area.

Data storage devices currently in use in personal computer products and network arrays today are intelligent drives, in that they have integrated controllers and cache memory within the drive electronics. The interfaces in use today include Small Computer System Interface (SCSI), Integrated Drive Electronics (IDE), Enhanced Small Device Interface (ESDI) and "Firewire" (IEEE 1394). Each of these interface types includes a command protocol, wherein read, write and positioning commands can be issued to the drive in order to obtain data from, or write data to the physical storage media.

There are different methods for transferring data between the drive controller and a computer system. Direct Memory Access (DMA) is a method wherein a controller on a bus, typically one dedicated to performing DMA transfers, is supplied. A transfer is programmed into the DMA controller, and the controller moves data between a device and memory. This technique has the advantage of offloading the task of moving data from the processor, at a cost of having a DMA controller contending for the bus with the main processor, as well as the additional cost of having the controller in the system.

Another widely used transfer technique is programmed input/output (PIO). PIO simply means that a main processor in the computer performs the data transfer via memory and or port manipulation instructions. The advantage to this technique is that there is no bus contention, the disadvantage that the processor is occupied with transferring the data and therefore cannot perform other tasks while the transfer is completing.

Thus, a data storage device can be a bottleneck in computer system performance. A computer, for example, can issue a series of commands via a SCSI interface to a disk drive, but the disk drive can only process one data transfer to a physical disk at a time. The transfer controller within the drive is typically busy performing these transfers from the host computer system to the disk drive write electronics, while a write command is being completed. Usually, when a write command is received from the host, a seek operation is performed to move the head to the proper position to write the next data block. But, at times the seek operation completes before the host has started the transfer of data to the drive, causing the write to miss. The write must then be retried, at a cost of system performance. This happens frequently when large amounts of data are being written in contiguous clusters.

A disadvantage of present storage devices is that while write commands are being processed, other operations are suspended. So, if a write miss occurs, all of the operations are delayed. In general, all commands issued after a write command are delayed, pending completion of the write transfer to the physical storage media.

It would therefore be desirable to devise a method that will improve the performance of a storage device by reducing or eliminating missed writes. In addition, it would be desirable to devise a storage device with improved performance by decreasing the probability that host data is not ready when the write seek has completed. It would further be desirable to devise a method and data storage device that will allow further processing of commands while writes to the physical storage media are still pending.

SUMMARY OF THE INVENTION

It is therefore one object of the present invention to provide an improved data storage device for a computer system.

It is another one object of the present invention to provide a method to improve the throughput of a direct access storage device (DASD).

The foregoing objects are achieved in a method for improving performance of a direct access storage device and a direct access storage device wherein the data transfer portion of write commands is completed before the transfer to the storage media is commenced. A process in the idle loop of the device's controller examines the command queue and sets up a DMA controller to perform the data transfer portion of write commands from an interface to a dual-port cache, while transfer of data to the physical disk is still pending or occurring from a prior command. Upon completion of the prior command, an interrupt is generated and in response to the interrupt, the interrupt is serviced, and if any data is ready for transfer from the cache to the storage media, a second DMA controller is set up to complete the transfer.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like parts throughout, and:

DESCRIPTION OF THE ILLUSTRATIVE EMBODIMENTS

Figure 1:
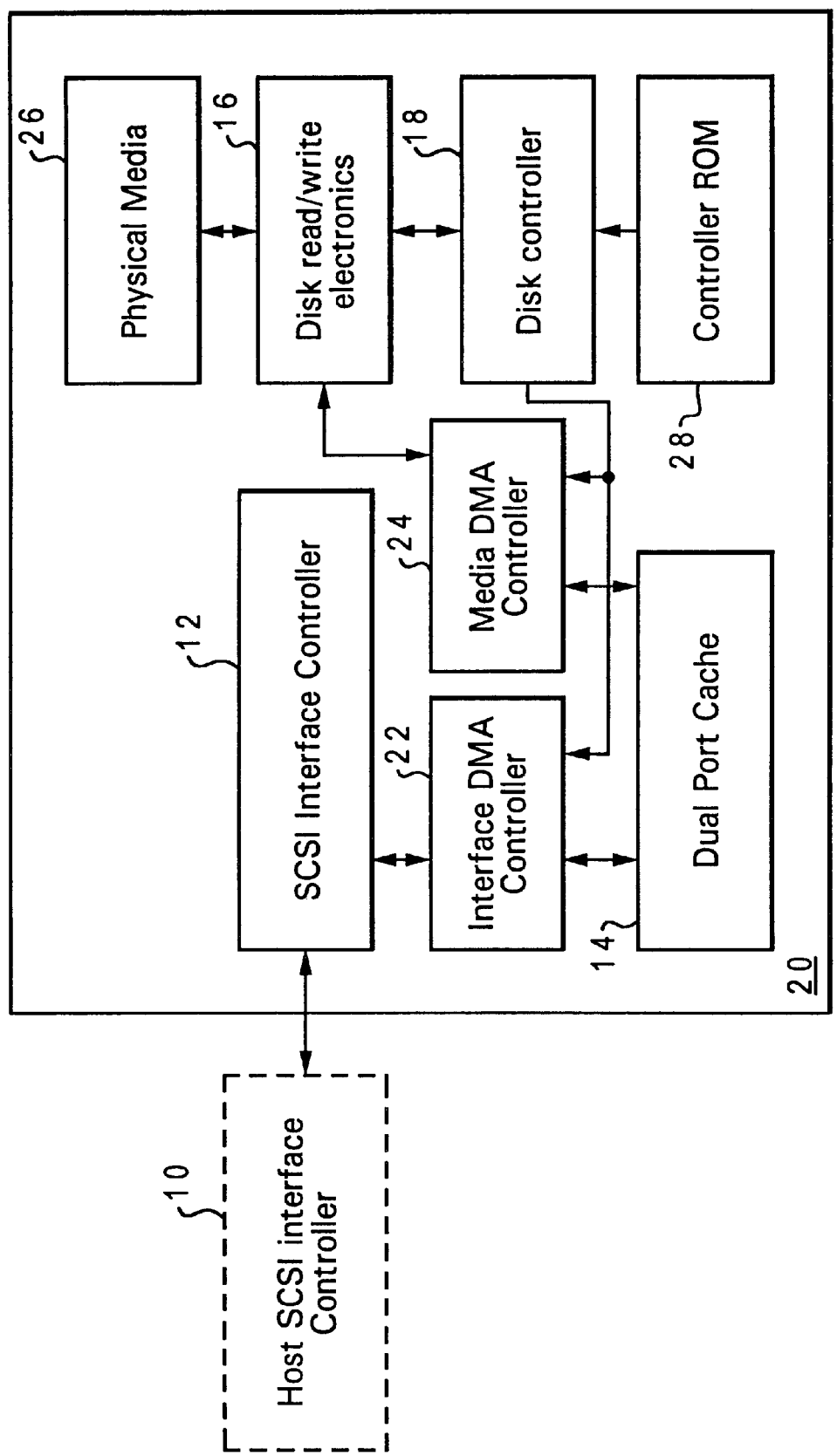
FIG. 1 is a block diagram of a data storage device in which the present invention may be practiced.

With reference now to the figures and in particular with reference to FIG. 1, a data storage device 20 is illustrated. Host SCSI interface controller 10, connects the data storage device to the host computer system and SCSI interface controller 12 provides the data storage device side of the SCSI interface. The data storage devices of the present invention are not limited to those with SCSI interfaces. The use of a SCSI interface is exemplary and the invention may be practiced with IDE, ESDI, IEEE 1394 or other data storage device interface.

Dual-port cache 14 provides temporary storage for data, such as read data that has been cached from recent reads of physical media 26. The present invention uses this cache additionally to store data for writes, until the data has been written to the disk. The present invention has the advantage of being able to transfer data from interface controller 12 to dual-port cache 14 while data for a previous command is being transferred from dual-port cache 14 to disk read/write electronics 16. This provides an increase of performance for certain write operations of up to sixty percent.

A background process, the queue governor, provides management of a command queue in the disk. It improves performance through early completion of commands and thereby increases the disk's queue depth in a random write environment. Not only does this allow the disk to complete data and status phases for multiple commands before it finishes writing data for the first command to disk read/write electronics 16, but the drive has more commands to choose from when it decides which command within the command queue to perform next. The command sequence can be altered to improve seek and latency times.

The data transfers in storage device 20 are carried out by DMA controllers 22 and 24. Interface DMA controller transfers data from interface controller 12 to dual-port cache 14. Media DMA controller 24, transfers data from dual-port cache 14 to physical media 26. DMA transfers are programmed by disk controller 18 and occur asynchronously once disk controller 18 has set them up by programming the appropriate transfer address and block size.

Disk read/write electronics 16 comprises the data heads that write to and read from the physical storage media, such as a magnetic platter, and also the electronics which provide the signals to accept transfers of data between dual-port cache 14 and the physical storage media 26. Disk controller 18 can be a dedicated logic design, but is preferably a general-purpose microcontroller or microprocessor with a program supplied to make it perform the dedicated task of managing the physical media and the interface to the host.

Controller Read-only memory (ROM) 28, provides storage for such a program that disk controller 18 executes. The present invention can be contained as a program in controller ROM 28 and may also be provided in media form, for use with data storage devices in which controller ROM 28 is an electrically alterable ROM and provision is made for reprogramming or "upgrading" controller ROM 28 through commands issued to SCSI interface controller 12.

Figure 2:
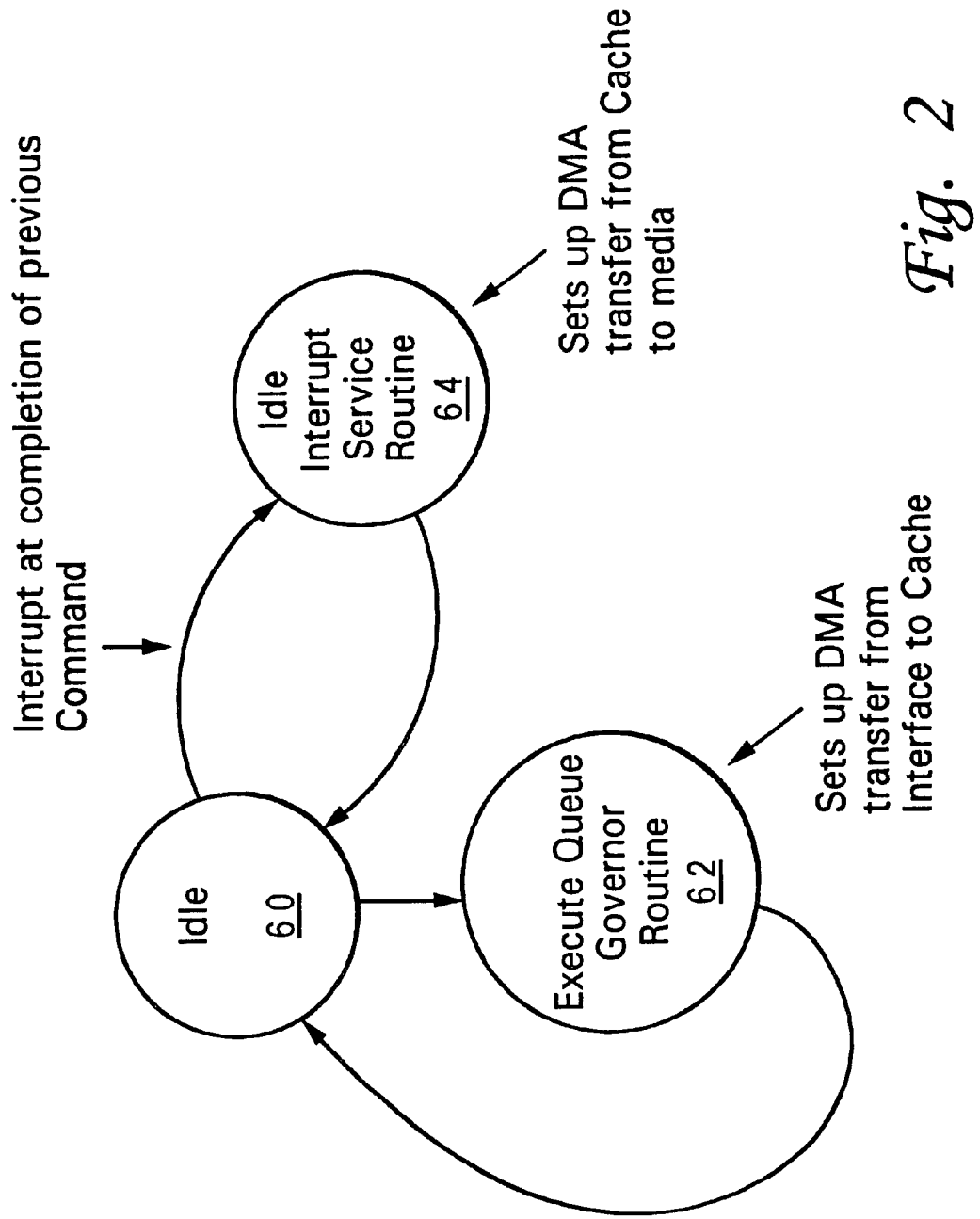
FIG. 2 is a state diagram which illustrates an embodiment of a method of the present invention.

Referring additionally to FIG. 2, the state sequences of the present invention are shown. Disk Controller 18 is in an idle state (state 60) when it has no outstanding tasks to perform. The present invention places an additional task in the idle program loop, which may be executed constantly during idle, or at intervals determined by a timer, or by some other suitable means for periodically scheduling a task. A queue governor is executed (state 62) every time the task is scheduled. The queue governor manages the command queue of the present invention and provides the advantages of the present invention. After executing the queue governor, disk controller 18 returns to idle (state 60).

At the end of commands such as seeks or writes to the physical media, either disk read/write electronics 16 or media DMA controller 24 may generate a hardware interrupt. In response to this interrupt, disk controller 18 executes an interrupt service routine (state 64); when the routine is completed, disk controller 18 returns to idle state 60 (state 60).

Figure 3:
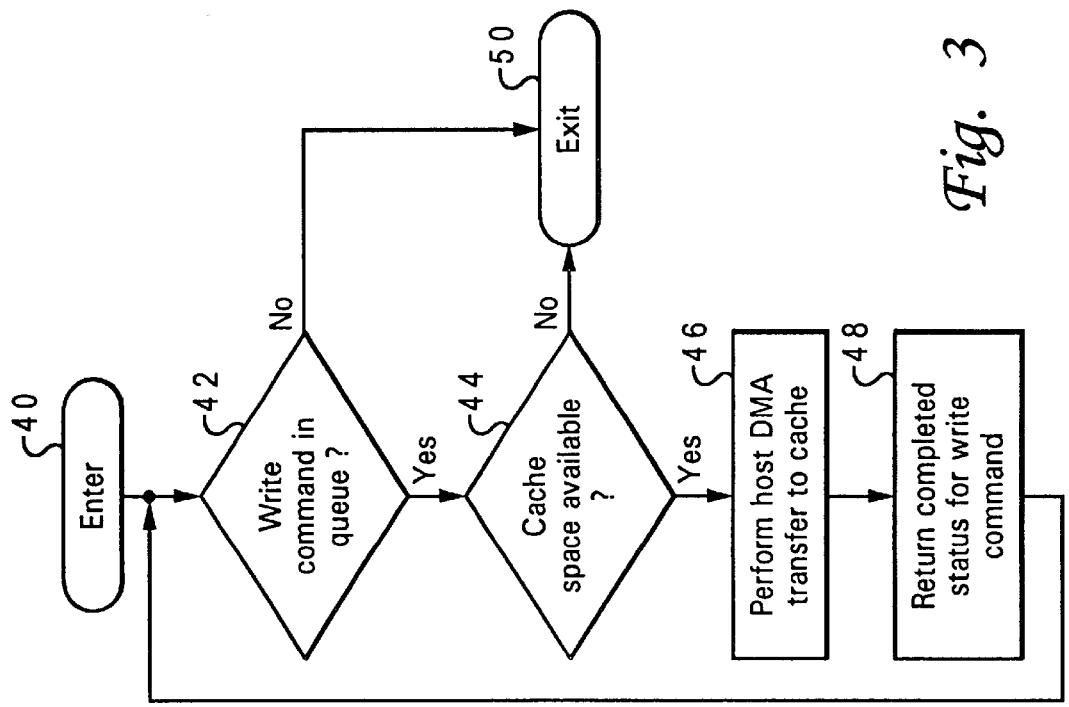
FIG. 3 is a flow diagram showing the an embodiment of the methods of the present invention.

Operation of the queue governor is illustrated in FIG. 3. When the queue governor is scheduled (state 62) the governor routine is entered (step 40) and examines a command queue to determine that a write request has been queued (step 42). If there is a write request queued, and if dual-port cache 14 has space available to receive data from SCSI interface controller 12 (decision 44), then a DMA transfer is set up in interface DMA controller 22 to transfer data to dual-port cache 14 from host SCSI interface controller 10 (step 46). After the DMA transfer is complete, a write completed status is returned to host SCSI interface controller 10 by SCSI interface controller 12 (step 48). This frees the host computer from further delay associated with the write command.

Figure 4:
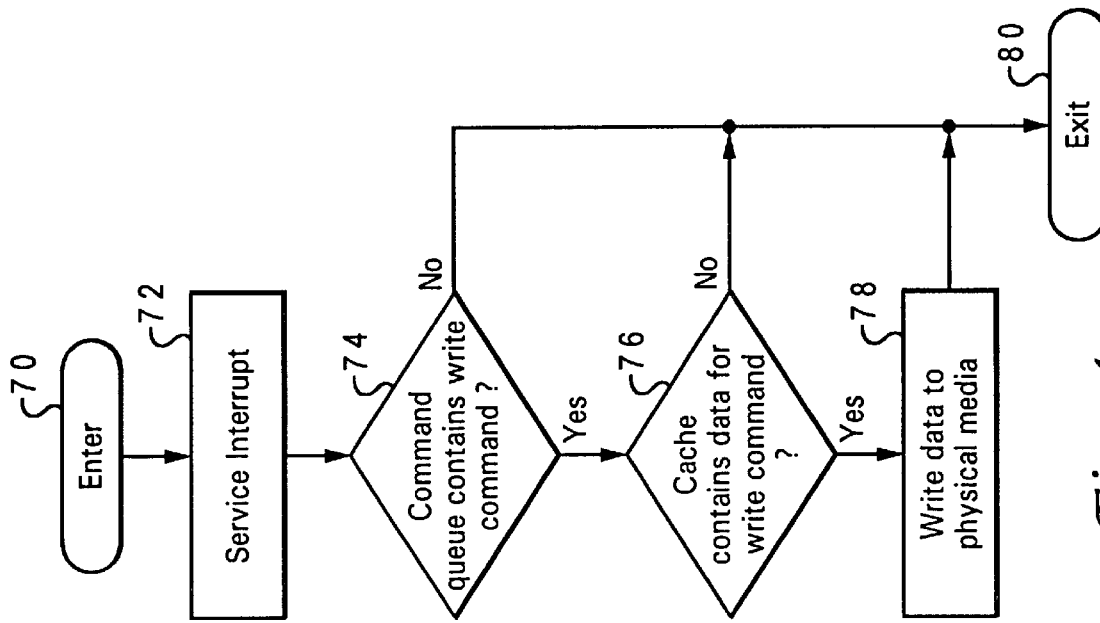
FIG. 4 is a flow diagram which illustrates an embodiment of a part of one method of the present invention.

Completion of the write command is performed by the interrupt service routine that is entered in state 64. Referring now to FIG. 4, the interrupt service routine is entered (step 70), the interrupt hardware is serviced (step 72), including any interrupt specific tasks that are outside the operation of this invention. For example, if the command queue contains a write command (test 74) and dual-port cache 14 contains data for the write command (test 76) then the data contained in dual-port cache 14 for the write is written to the physical media 26 (step 78). The command queue will contain data for the write command if the queue governor has executed (state 62) and caused the host data to be loaded into dual-port cache 14 by SCSI interface controller 12.

Thus, the present invention separates the transfer portions of the write commands into a transfer from the host SCSI interface to the storage device performed by one DMA controller, and a second transfer from cache 14 within the storage device to the physical media performed by a second DMA controller. This further improves performance by allowing disk controller 18 to set up a DMA transfer for a first write command from dual-port cache 14 to disk read write electronics 16, and that transfer can occur concurrently with a DMA data transfer for a second write command from SCSI interface controller 12 to dual-port cache 14, since dual-port cache 14 can be simultaneously accessed by both DMA controllers.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. For example, although the invention has been described with respect to a data storage system executing software that directs the method of the present invention, it should be understood that the present invention may be embodied in an image file to upgrade existing device firmware within a data storage device. It is therefore contemplated that such modifications can be made without departing from the spirit or scope of the present invention as defined in the appended claims.

What is claimed is:

1. A method for performing write commands in a storage device having storage media, while a first command is pending, comprising the steps of:

first determining that a command queue of said storage device contains a write command;

second determining that a cache space within a dual-port cache is available to contain data for said write command;

responsive to said first and second determining step, first setting up a first DMA transfer for transferring said data for said write command from an interface to said cache space; and responsive to completion of said first command, second setting up a second DMA transfer for writing data to said storage media from said cache space.

2. The method of claim 1, further comprising the steps of:

servicing an interrupt indicating said completion of said first command in an interrupt service routine;

within said interrupt service routing, examining a directory to determine that said data is present in said cache space; and within said interrupt service routine, and further responsive to said examining step, performing said second setting up step.

3. The method of claim 1, further comprising the steps of:

entering an idle state in a program controlling said storage device operation; and from said idle state, executing a queue governor program, said queue governor program then performing said determining steps and responsive to said determining steps performing said first setting up step.

4. The method of claim 1, further comprising the step of sending a status indicating completion of said write command before said second DMA transfer is complete.

5. The method of claim 1, wherein said interface is a SCSI interface and said first setting up step sets up a first DMA transfer for transferring said data for said write command from said SCSI interface to said cache space.

6. The method of claim 1, wherein said interface is an IDE interface and said first setting up step sets up a first DMA transfer for transferring said data for said write command from said IDE interface to said cache space.

7. The method of claim 1, wherein said interface is a serial interface and said first setting up step sets up a first DMA transfer for transferring said data for said write command from said serial interface to said cache space.

8. The method of claim 1, further comprising:

sending a status indicating completion of said write command before said writing step is performed;

servicing an interrupt indicating said completion of said first command;

within said interrupt service routing, examining a directory to determine that said data is present in said cache space; and within said interrupt service routine, and further responsive to said examining step, performing said second setting up step.

9. A storage device comprising:

at least one storage media;

interface means for connection to a host system;

a dual-port cache having memory for temporarily storing data;

a first DMA controller for transferring data between said interface and said dual-port cache;

a second DMA controller for transferring data between said dual-port cache and said storage media; and control means coupled to said first DMA controller and said second DMA controller, said control means setting up said first DMA controller when write commands are received when memory in said dual-port cache is available for use, and returning status complete responses to said interface for said write commands before said second DMA controller has transferred said data to said storage media.

10. The direct access storage device of claim 9, wherein completion of transfers of data to said storage media from said dual-port cache is signaled by an interrupt, and said control means comprises a processor and memory for executing program instructions and said program instructions executed in response to said interrupt examine said cache to determine if data is present for writing to said storage device, and write said data to said storage device if it is present.

11. The direct access storage device of claim 9, wherein said control means comprises a processor and memory for executing program instructions and said program instructions enter an idle state, and from said idle state said processor executes a queue governor program for setting up said first DMA controller.

12. The direct access storage device of claim 9, wherein said control means causes said interface means to indicate that a write command has completed, before said data has been transferred to said storage media.

13. The direct access storage device of claim 9, wherein said interface means implements a SCSI interface.

14. The direct access storage device of claim 9, wherein said interface means implements an IDE interface.

15. The direct access storage device of claim 9, wherein said interface means implements a serial interface.

16. The storage device of claim 9, wherein said control means causes early completion of DMA transfers for write commands by setting up said first DMA controller while said second DMA controller is performing a transfer for a previous command, further comprising a processor and memory for executing program instructions, said program instructions enter an idle state, from said idle state said processor executes a queue governor program for setting up said first DMA controller, wherein the completion of data transfers between said dual-port cache and said storage media is signaled by an interrupt, said control means further executes program instructions in response to said interrupt to examine an indication that said dual-port cache has data present for writing to said storage device, and said control means sets up said second DMA controller for writing said data to said storage device if said data is present.

* * * * *